US007209905B2

(12) United States Patent
Obrea et al.

(10) Patent No.: US 7,209,905 B2
(45) Date of Patent: Apr. 24, 2007

(54) SYSTEM AND METHOD FOR DETECTING MAIL THEFT USING ADDITIONAL MAIL PIECES AS PROBES

(75) Inventors: Andrei Obrea, Seymour, CT (US); Cortland D. Starrett, Brookston, IN (US)

(73) Assignee: Pitney Bowes Inc., Stamford, CT (US)

( * ) Notice: Subject to any disclaimer, the term of this patent is extended or adjusted under 35 U.S.C. 154(b) by 476 days.

(21) Appl. No.: 10/729,503

(22) Filed: Dec. 5, 2003

(65) Prior Publication Data

US 2005/0125366 A1 Jun. 9, 2005

(51) Int. Cl.
*G06F 17/00* (2006.01)
*G07B 17/02* (2006.01)

(52) U.S. Cl. .................................. 705/402; 705/402

(58) Field of Classification Search ........ 705/400–410, 705/1, 62; 382/101
See application file for complete search history.

(56) References Cited

U.S. PATENT DOCUMENTS

| | | | | |
|---|---|---|---|---|
| 4,796,180 A | | 1/1989 | Riley | 364/400 |
| 4,998,626 A | * | 3/1991 | Ota | 382/102 |
| 5,043,908 A | | 8/1991 | Manduley et al. | 364/478 |
| 5,104,681 A | * | 4/1992 | Sansone | 427/8 |
| 5,388,049 A | | 2/1995 | Sansone et al. | 364/464.02 |
| 5,748,590 A | * | 5/1998 | Iwasaki et al. | 369/53.15 |
| 5,786,748 A | | 7/1998 | Nikolic et al. | 340/311.1 |
| 2003/0101143 A1 | * | 5/2003 | Montgomery et al. | 705/62 |

FOREIGN PATENT DOCUMENTS

| | | | |
|---|---|---|---|
| EP | 1555627 | * | 10/1997 |
| WO | WO 02/21383 A1 | | 3/2002 |

OTHER PUBLICATIONS

"Tips for testing on X.400 networks", Communications News, p38, May, 1993.*

* cited by examiner

*Primary Examiner*—John W. Hayes
*Assistant Examiner*—Rutao Wu
(74) *Attorney, Agent, or Firm*—George M. Macdonald; Angelo N. Chaclas

(57) ABSTRACT

A method of tracking mail pieces includes determining that an observation event has not occurred with respect to a high value mail piece (HVMP). If it is also determined that a corresponding observation event has occurred with respect to another mail piece that was mailed with the HVMP, then an alarm indication may be provided with respect to the HVMP.

20 Claims, 7 Drawing Sheets

SYSTEM AND METHOD FOR DETECTING MAIL THEFT USING ADDITIONAL MAIL PIECES AS PROBES

BACKGROUND

This invention relates generally to the field of detecting theft of mail pieces and more particularly to using an automated mail piece tracking system to detect theft.

The United States Postal Service (USPS) operates a letter tracking system known as the "CONFIRM" system. The CONFIRM system employs automatic scanning of barcodes on letters as the letters are automatically sorted by sorting equipment in postal facilities. Each letter to be tracked carries two barcodes: (a) the well-known POSTNET bar/half-bar code which may indicate an 11-digit zip code (i.e., a postal delivery code; the 11 digit POSTNET code may also be referred to as a delivery point barcode or "DPBC"); and (b) the PLANET code, which is also well known from documents published by the USPS. The PLANET code is also a bar/half-bar code and serves to uniquely identify a mailing in which the letter was produced. Assuming that only one mail piece in each mailing is sent to a given delivery address, and given that the DPBC indicated by the POSTNET barcode corresponds to a unique delivery address, the combination of the POSTNET and PLANET barcodes on a mail piece serve to uniquely identify the mail piece. With scanning of the POSTNET and PLANET barcodes on a mail piece at some or all of the postal sorting facilities as the mail piece moves through the mail delivery system, the progress of the mail piece can be tracked and confirmed.

Many mail pieces are of little value or interest except to the mailer and the recipient. However, other mail pieces may be of significant value to third parties and so may run the risk of theft en route from the mailer to the recipient. For example, credit and debit cards are frequently sent by first class mail, and may be attractive to would-be thieves. Card activation procedures are customarily employed with respect to credit or debit cards sent through the mail, but may not always adequately prevent fraudulent use of stolen cards. One particular difficulty facing those who wish to prevent wrongful use of stolen credit or debit cards is the period of several days that may elapse from mailing of a card until its expected delivery date. If a card is stolen soon after mailing, the thief may have two or three days to fraudulently use the card before delivery or non-delivery can be checked with the intended recipient.

With the USPS CONFIRM system, tracking of a mail piece such as a letter that contains a credit or debit card, and comparison of actually recorded observation events versus an expected sequence of observation events, may provide an opportunity for an early warning that the mail piece and its valuable contents have been stolen or gone astray. The mailer and/or card issuer may then take precautions such as preventing authorization of charges using the card in response to an indication that the expected sequence of observation events has not occurred.

However, there may be difficulties in relying upon the CONFIRM system to indicate loss or theft of valuable mail pieces. In particular, such a practice may be prone to "false positive" indications of theft or loss. This may occur because it is not unusual for some hand-sortation of mail pieces to occur instead of normally occurring machine sortation and scanning. Alternatively, processing of mail pieces may simply be delayed for various reasons. For these or other reasons, normally expected scanning of some or all of a mailing may be omitted or delayed even though the mail pieces have not been lost or stolen and are ultimately delivered in good time to the intended destinations. Therefore, reliance on the CONFIRM system in detecting theft or loss of valuable mail pieces may result in excessive expense in the taking of counter-measures in cases where theft or loss has not in fact occurred.

SUMMARY

Accordingly, a method and system are provided for improved detection of loss or theft of valuable mail pieces.

In one aspect, a method includes determining that a first expected observation event has not occurred for a first mail piece, determining that a second expected observation event has occurred for a second mail piece, and providing an alarm indication with respect to the first mail piece based at least in part on non-occurrence of the first expected observation event and on occurrence of the second expected observation event.

As used herein and in the appended claims, an "observation event" refers to an occurrence in which a code on a mail piece is scanned by a scanning device such as a barcode reader or another automatic process detects and identifies a mail piece and a code associated therewith. In some embodiments, an "observation event" may alternatively refer to an occurrence in which an RFID (radio frequency identification) reader reads an RFID tag. An "expected observation event" refers to an observation event that is expected to occur within a predetermined time interval after mailing of a mail piece or after another observation event. An observation event may, in some cases herein and/or in the accompanying drawings alternatively be referred to as a "scan event". An "alarm indication" refers to an indication of increased likelihood that a mailpiece has been lost or stolen.

The first and second mail pieces may have been simultaneously delivered to a postal authority prior to the determination of the non-occurrence of the first expected observation event and prior to the determination of the occurrence of the second expected observation event. The first mail piece may have significant intrinsic value or potential value to a thief and may be referred to as a "high value mail piece" or "HVMP". The second mail piece may carry a postal delivery code that directs the second mail piece to be delivered via the same post office as the HVMP. The second mail piece may have little or no intrinsic or potential value, and may be referred to as a "probe". The probe may have a very high probability of traveling in the same container(s) with the HVMP due to the two mail pieces sharing the same starting point at the postal authority, the same destination point and the same time of induction into the postal authority.

The term "postal authority" should be understood to include the USPS and any other letter or parcel delivery service.

By sending one or more probes with a HVMP at the same time and along the same route to a delivering post office with the HVMP, the probe may serve to confirm whether a failure of the normal observation event pattern for the HVMP actually indicates loss or theft of the HVMP. That is, if the normal observation event pattern is similarly disrupted for both the HVMP and the probe, it may reasonably be concluded that a disruption occurred in the scanning of the batch of mail which included the HVMP and the probe, without actual loss or theft of the HVMP. On the other hand, if an expected observation event for the HVMP does not occur, but the corresponding expected observation event for the probe does occur, then loss or theft of the HVMP may be inferred with a relatively high degree of confidence. Counter-measures against theft or loss may be taken only in the latter cases, and the expense of taking counter-measures in case of false positives may be reduced.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

In the system and method of the present invention, one or more probe mail pieces may be mailed together with a HVMP. The HVMP is tracked with a system like the USPS CONFIRM system. If an expected observation event for the HVMP does not take place, the observation event history for the probe mail piece or pieces is examined. If a corresponding observation event did occur for the probe, then it may be inferred with a relatively high degree of confidence that the HVMP has been lost or stolen, and an appropriate alarm indication may be provided. Suitable counter-measures in regard to a supposed theft may then be taken. If a corresponding observation event did not occur for the probe, then no alarm indication may be given, and counter-measures may be omitted.

Figure 1:
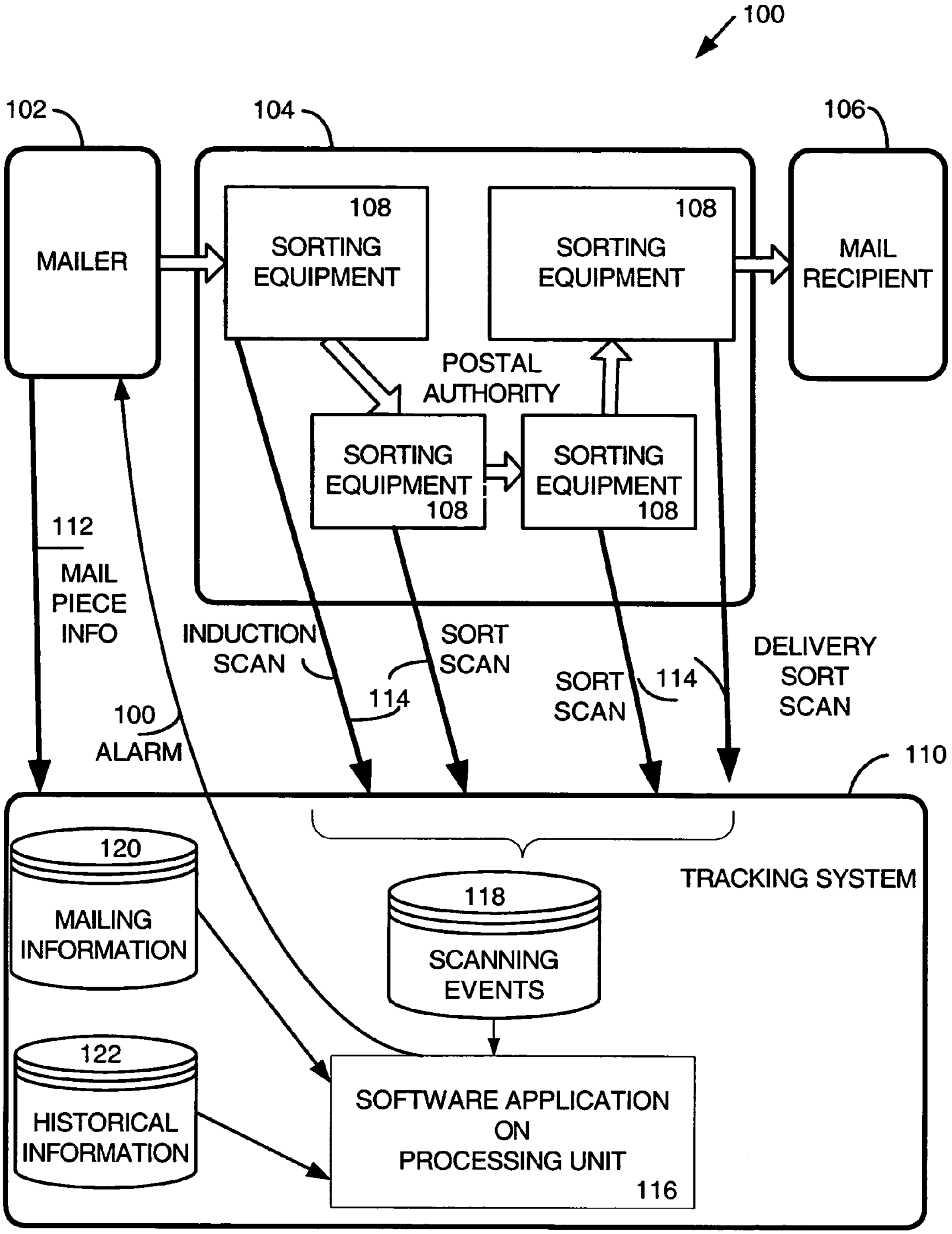
FIG. 1 is a block diagram that illustrates a system provided in accordance with the invention for improved detection of theft of mail pieces.

Referring now to the drawings, and particularly to FIG. 1, the reference numeral 100 indicates generally an apparatus for handling and tracking mail in accordance with an embodiment of the present invention. The system 100 includes a mailer 102 that is the source of a mailing that includes one or more HVMPs and one or more probes. The system 100 also includes a postal authority 104 (such as the USPS) which receives the mailing from the mailer 102 and delivers an HVMP (not separately shown) to a mail recipient 106. The postal authority 104 maintains and operates sorting equipment 108 at a number of different postal facilities (not separately shown). The sorting equipment 108 is operable to automatically sort mailings by reading barcodes such as the POSTNET barcode. The sorting equipment 108 includes systems for observing mail pieces in the mail stream to uniquely identify a mail piece at a certain time and place and/or purpose as an observation event. The sorting equipment uses scanning devices (not separately shown) such as barcode readers to scan and read barcodes on mail pieces loaded for sortation into the sorting equipment 108. Thus the scanning devices are used for observation of mail pieces. For example, the sorting equipment may be capable of reading POSTNET and PLANET barcodes in accordance with the USPS CONFIRM system. The sorting equipment may record and transmit data that indicates the occurrence of observation events. The data corresponding to each observation event may include a timestamp or time code indicative of the time of the observation event, the mailing identifier included in the PLANET code carried by the mail piece that was the subject of the observation event, and the 11 digit zip code represented by the POSTNET DPBC carried by the mail piece that was the subject of the observation event.

The system 100 may also include a mail piece tracking system 110 provided in accordance with the present invention. The mail piece tracking system 110 may be connected via a data channel 112 to the mailer 102 (and more specifically to a computer, which is not separately shown, that is maintained by the mailer 102) to receive from the mailer 102 data concerning a mailing delivered to the postal authority 104 by the mailer 102. The mail piece tracking system 110 may also be connected via respective data channels 114 to each item of sorting equipment 108 to receive the observation event data from the sorting equipment 108. (In addition or alternatively, some or all of the sorting equipment 108 may be connected to one or more postal authority computers (not shown) which may gather and consolidate the observation event data generated by the sorting equipment 108. The postal authority computer or computers may then relay the consolidated observation event data to the mail piece tracking system 110. The postal authority computer or computers may determine that the mail piece tracking system 110 is the appropriate recipient of the observation event data on the basis of the mailing identifier included in the PLANET code read from the mail pieces. Preferably the observation event data is supplied to the mail piece tracking system 110 in real time or shortly after the observation events occur.)

The mail piece tracking system 110 includes a processing unit 116 controlled by a software application (not separately indicated in FIG. 1) so that the mail piece tracking system operates in accordance with an embodiment of the present invention. Details of the software application will be provided below. An observation event database 118, a mailing information database 120 and a historical information database 122 are included in the mail piece tracking system 110 and are accessible by the processing unit 116. The observation event database 118 stores observation event data downloaded to the mail piece tracking system 110 from the sorting equipment 108 of the postal authority 104. The mailing information database 120 stores mailing information downloaded from the mailer 102 to the mail piece tracking system 110. The mailing information may include data indicative of the mailing identifier and 11-digit zip codes of the mail pieces to be tracked by the mail piece tracking system 110. The mailing information may also indicate the data and/or time at which the mailing including the mail pieces was or will be delivered to the postal authority 104. The historical information database 122 may store information that indicates a sequence of expected observation events for the mailpieces. For example, the historical information database 122 may store information from which a likely sequence of observation events, including likely timing of the observation events, may be inferred for all of the mail pieces in the mailing or at least for the HVMPs and probes that are to be tracked by the mail piece tracking system 110.

As will be seen, the mail piece tracking system may operate, based on data stored in the databases 118, 120, 122, to selectively supply to the mailer 102 an alarm indication, via a data channel 124, when there is reason to infer that a HVMP has been lost or stolen.

Figure 2:
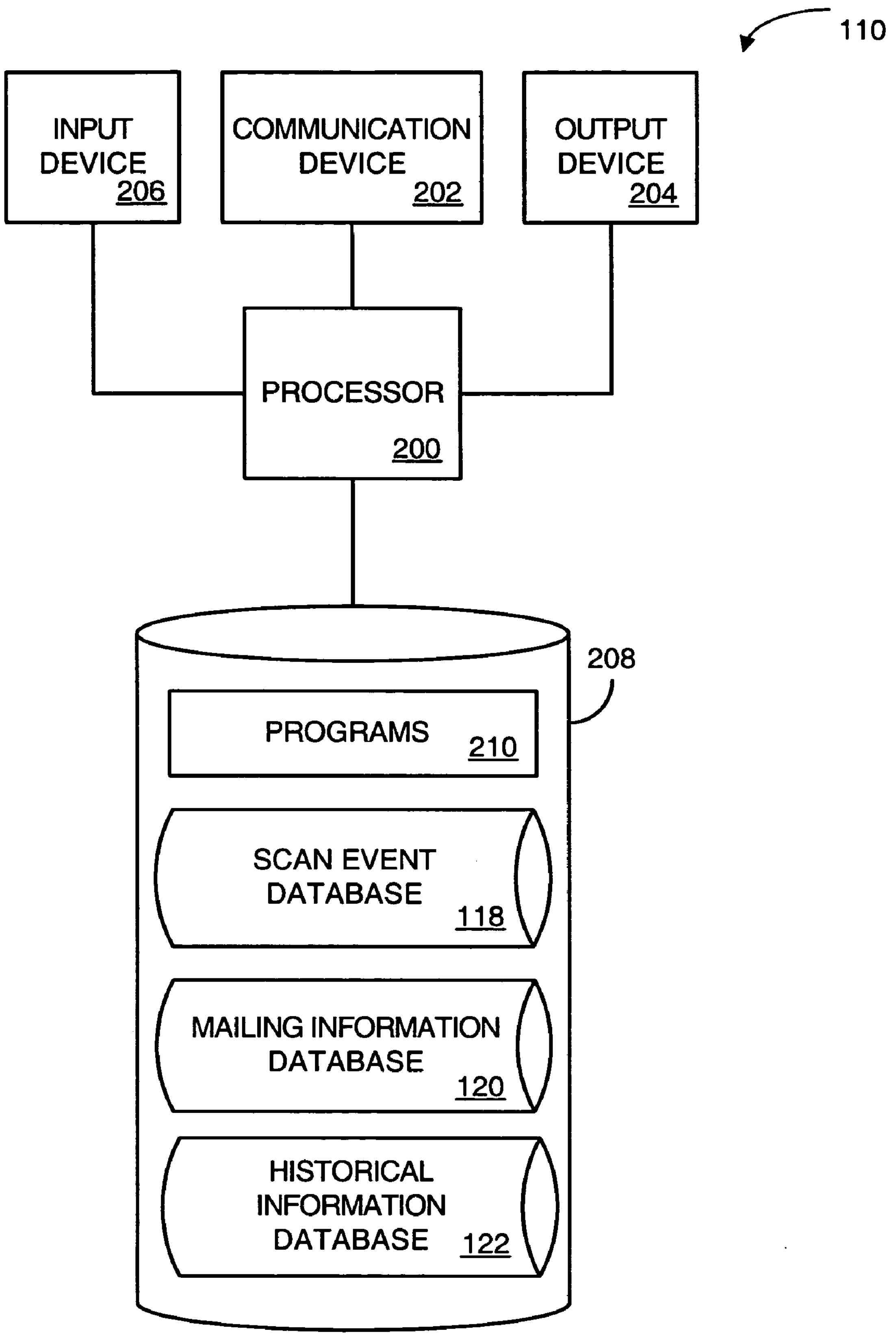
FIG. 2 is a block diagram that illustrates a mail piece tracking system that is part of the system of FIG. 1.

FIG. 2 is a block diagram that illustrates an embodiment of the mail piece tracking system 110 shown in FIG. 1. Generally, in some embodiments, the mail piece tracking system, in its hardware aspects, may be constituted by conventional computer hardware. As seen from FIG. 2, the mail piece tracking system 110 may include a processing unit 200. The processing unit 200 may be constituted by one or more processors of the type used in server computers, mainframe computers, minicomputers and/or desktop computers. The mail piece tracking system 110 may also include a communication device 202 in communication with the processing unit 200. The communication device 202 may, for example, comprise one or more data communication ports by which the processing unit 200 may exchange data with the postal authority 104 and/or the mailer 102.

The mail piece tracking system 110 may further include an output device 204 in communication with the processing unit 200 and an input device 206 in communication with the processing unit 200. The output device 204 may, for example, comprise one or more printers and/or one or more display monitors. In some embodiments, an alarm indication or indications may be provided via a print out or display provided by the output device 204. Such indications may be in addition to or instead of alarm indications provided directly to the mailer 102 (FIG. 1) via the communication channel 124.

Continuing to refer to FIG. 2, the input device 206 may include conventional devices such as a keyboard and/or mouse or other pointing device. The input device 206 may be used by a human operator to control, administer, maintain or provide input to the mail piece tracking system 110.

There may also be included in the mail piece tracking system 110 a storage device 208 that is in communication with the processing unit 200. The storage device 208 may comprise, for example, a combination of magnetic, optical and/or semiconductor memory devices. In some embodiments, the storage device 208 may include one or more hard disk drives, RAM (random access memory), ROM (read only memory) and one or more drives for removable data storage media.

The storage device 208 may store one or more software programs 210 that control operation of the mail piece tracking system 110. For example, the software programs may include an operating system, data communications software, database management software, device drivers and one or more application programs that control the mail piece tracking system to track mail pieces in accordance with processes defined by the present invention, as described in more detail below. More specifically, the programs 210 may include computer readable program code to cause the mail piece tracking system 110 to perform process steps in accordance with the present invention, as described herein.

The storage device 208 may also store the observation event database 118, the mailing information database 120 and the historical information database 122 discussed above in connection with FIG. 1.

Figure 3:
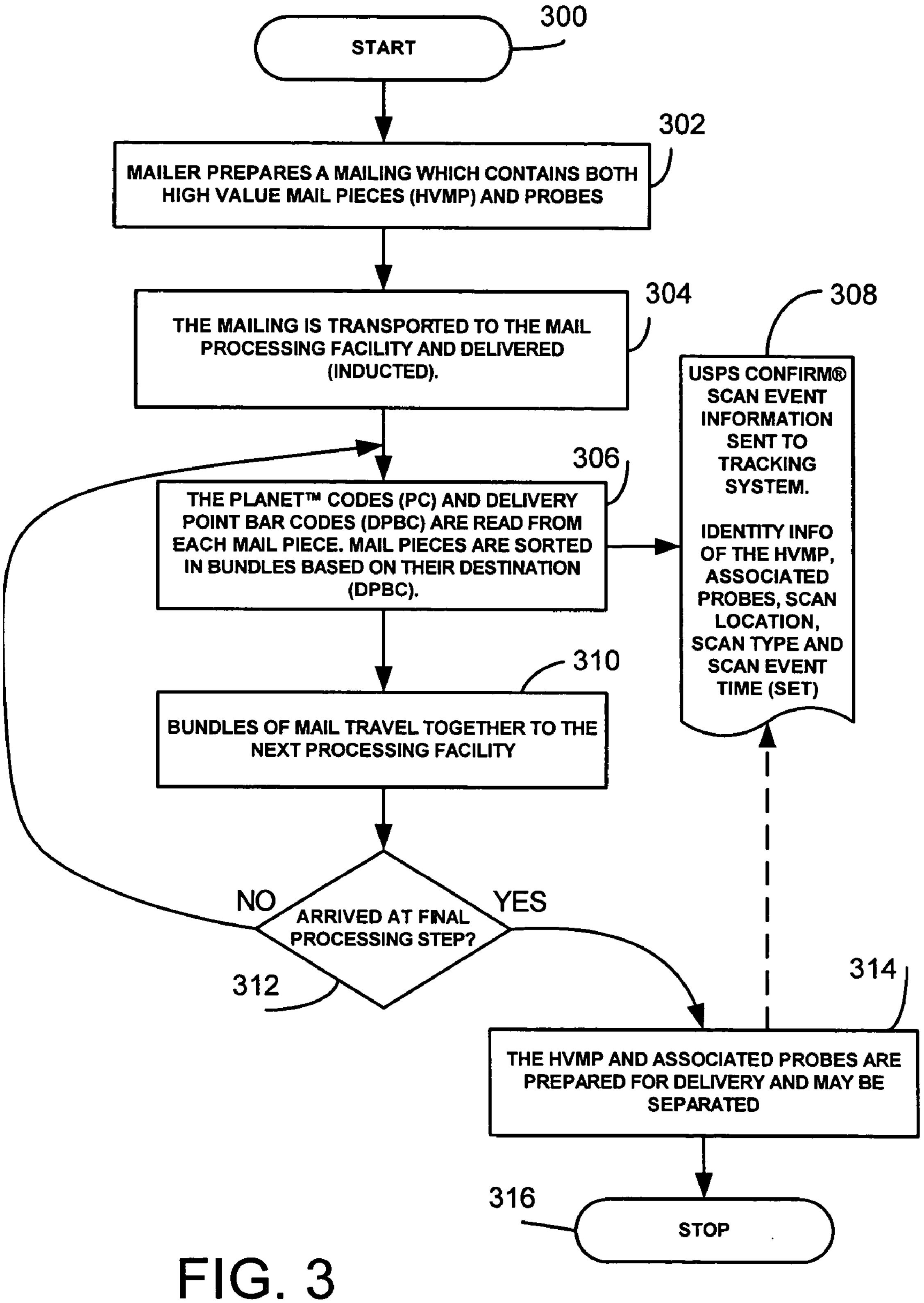
FIG. 3 is flow chart that illustrates a process for physical processing of mail pieces in accordance with an embodiment of the invention.
Figure 4:
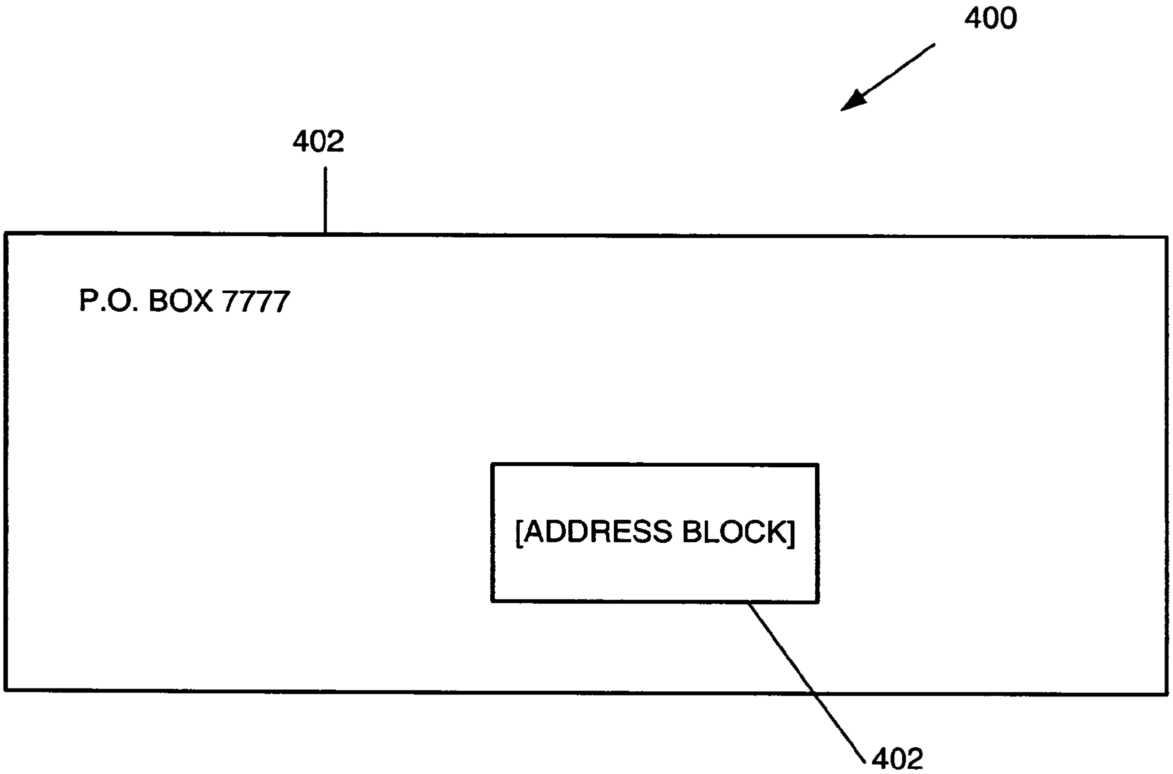
FIG. 4 is a schematic illustration of a high value mail piece (HVMP).

FIG. 3 is flow chart that illustrates a process for physical processing of mail pieces in accordance with an embodiment of the invention. The process of FIG. 3 starts at 300 and proceeds to step 302. At step 302, the mailer 102 (or one or more contractors retained by the mailer 102) prepares a mailing that contains both HVMPs and probes. The HVMPs may contain any enclosure for which there is a significant risk of theft. For example, the HVMPs may each contain one or more credit cards or debit cards. FIG. 4 is a schematic view of the exterior of a typical HVMP 400. The HVMP 400 may comprise an envelope 402 which carries an address block 404 (details of the address block will be described below). The address block 404 may be printed directly on the envelope 402, printed on a label adhered to the front of the envelope 402, and/or visible through a window (not separately shown) in the envelope 402. In accordance with conventional practices, the HVMP 400 may not indicate the identity of the mailer and may be designed not to indicate that envelope 402 contains anything of value.

Figure 5:
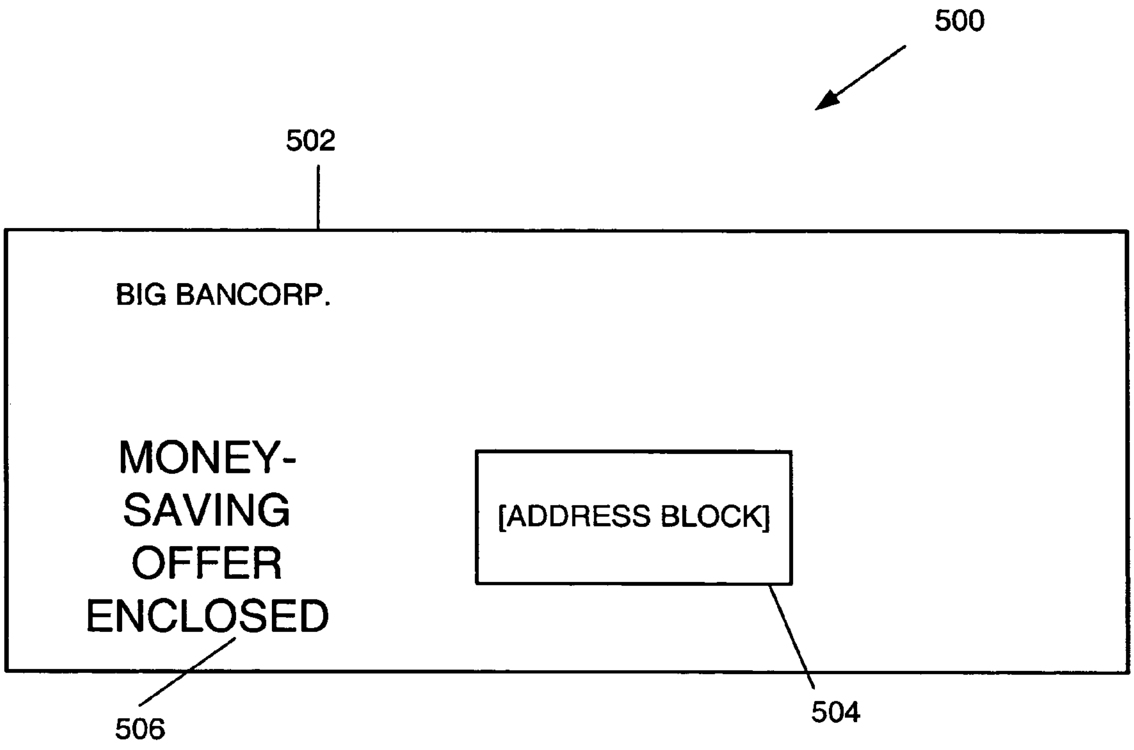
FIG. 5 is a schematic illustration of a probe mail piece provided in accordance with the invention.

FIG. 5 is a schematic view of the exterior of a typical probe mail piece 500. The probe 500 may comprise an envelope 502 which carries an address block 504 (details of the address block will be described below). The address block 504 may be printed directly on the envelope 502, printed on a label adhered to the envelope 502, and/or visible through a window (not separately shown) in the envelope 502. The probe 500 may contain one or more items of direct mail advertising. The exterior of the envelope 502 may, as indicated at 506, have printed thereon information that clearly indicates that the probe is an advertising medium and is not of significant value to a third party. This indication 506 makes it quite likely that the probe 500 would not be attractive to a thief and would not be stolen. It will also be noted that the respective external appearances of the HVMP 400 and the probe 500 are quite different. This also tends to make it unlikely that the probe would be stolen.

Figure 6:
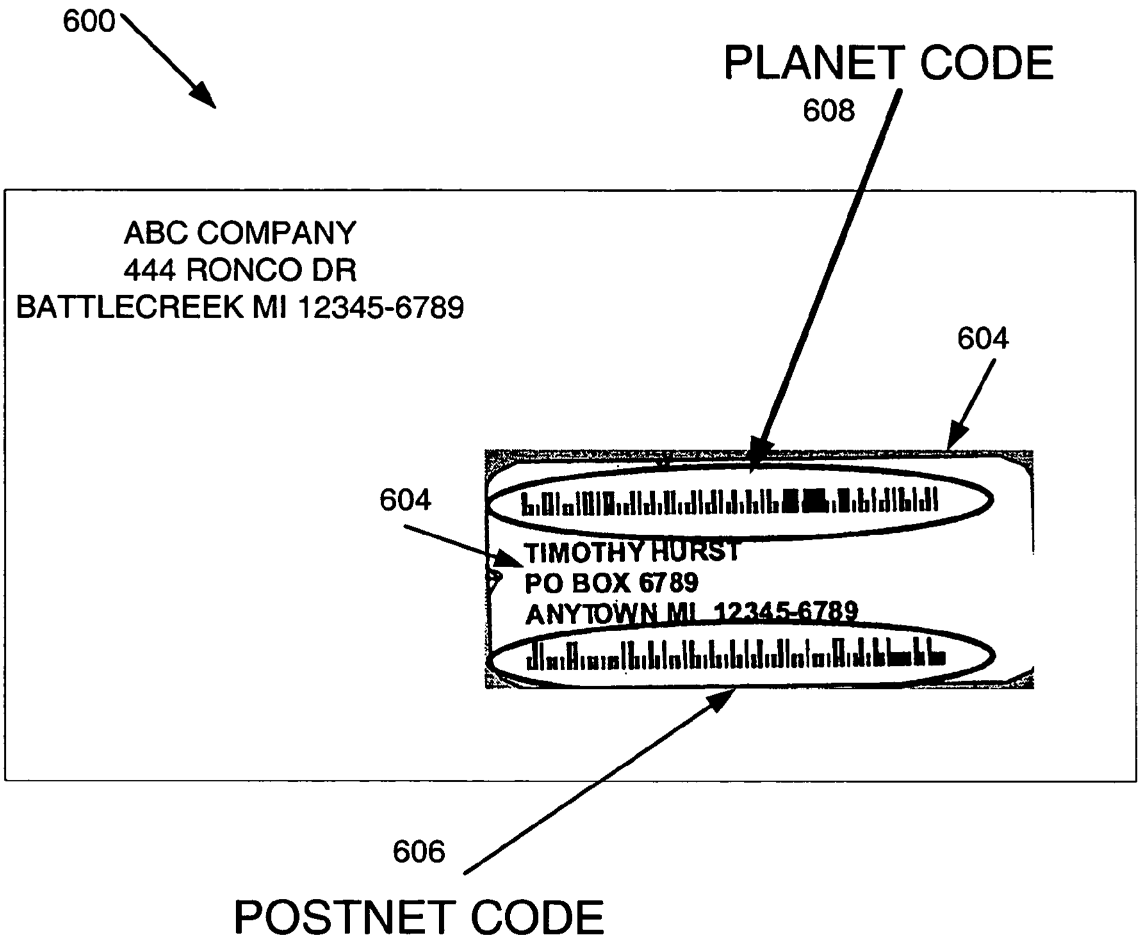
FIG. 6 (PRIOR ART)
FIG. 6 is a schematic illustration of a conventional mail piece showing an address block of a type that may be employed in the mail pieces of FIGS. 4 and 5.

FIG. 6 is a schematic view of a generic conventional mail piece 600. The mail piece 600 has an address block 602 which is illustrative of the format of the address blocks 404, 504 of the HVMP 400 and the probe 500. The address block 602 includes several lines of alphanumeric address information 604. Below the alphanumeric address information 604, and forming the last line of the address block 602, is a conventional POSTNET barcode (DPBC) 606. Above the alphanumeric address information 604, and forming the first line of the address block 602, is a conventional PLANET barcode 608. As will be recognized by those who are skilled in the art, the POSTNET barcode makes the mail piece 600 suitable for sorting by barcode-reading sorting equipment like the sorting equipment 108 shown in FIG. 1. The inclusion of the PLANET code in the address block 602 also makes the mail piece 600 suitable for automatic individual tracking through the operating facilities of the USPS by reading of the POSTNET and PLANET codes. It should be noted that in some embodiments, the location of one or both of the POSTNET code and the PLANET code will be changed.

The address blocks 404 and 504 of the HVMP 400 and the probe 500 may both have the same format as the exemplary address block 602 shown in FIG. 6. That is, both of the address blocks 404 and 504 may include a POSTNET code and a PLANET code, so that both the HVMP 400 and the probe 500 are suitable for sorting by automatic sorting equipment and are suitable for individual and automatic tracking through the operating facilities of the USPS.

Referring again to step 302 in FIG. 3, in some embodiments, for each 5 digit zip code to which at least one HVMP of the mailing is directed, the mailing may include one or more probes directed to the same 5 digit zip code. Consider, for example, an HVMP directed to zip code 10580. The POSTNET barcode on that HVMP would indicate 10580 plus six more digits that uniquely identify the destination address of the HVMP. In addition, the mailing, according to some embodiments of the invention, would also include one or more probes having POSTNET barcodes that would also indicate 10580 plus six more digits. The probe or probes may, but need not, have the identical POSTNET barcode that the corresponding HVMP has. That is, the POSTNET barcode of a probe should coincide to the extent of the first five digits (in some embodiments) with the POSTNET barcode of a related HVMP, but may or may not coincide with all 11 digits of the POSTNET barcode of the related HVMP. However, it will be appreciated that no two mail pieces in the mailing should have both the same POSTNET barcode and the same PLANET barcode. Thus, if a probe has the same PLANET code as its related HVMP, the probe should have a different destination address from the HVMP but within the same 5 digit zip code.

In some embodiments, the mailing prepared at step 302 may be formed by sorting together (at least by 5 digit zip code) two or more original mailings. One of the original mailings may be formed only of HVMPs, all of which bear the same PLANET code. At least one other of the mailings may be formed only of probes, all of which bear a PLANET code that is different from the PLANET code on the HVMPs. With this approach, at least some probes may share the same POSTNET code with a related HVMP, while still allowing the system 100 to distinguish between an HVMP and a related probe.

The mailing produced at step 302 should be sorted or otherwise arranged so that all mail pieces, both HVMPs and probes, that are addressed to a single 5 digit zip code are arranged together. Thus mailpieces for a given 5 digit zip code may be trayed together and thus can be expected to be processed together at least up to a final sort at the destination post office. From previous discussion, it will be appreciated that the function of a probe is to travel with one or more of the HVMPs through the postal authority's facilities and to provide an indication whether a failure to occur of an observation event relative to the HVMP is likely the result of wrongdoing or alternatively of a routine or innocent diversion from automated scanning. In various embodiments, there may be one probe in the mailing for each HVMP, or several probes for each HVMP, or one probe for a group of several or more HVMPs. The number of probes per HVMP, whether equal to, greater than, or less than one, may be based on the value of the HVMPs, with a higher ratio of probes to HVMPs possibly being preferable where the value of the HVMPs (or the cost of investigating or taking counter-measures against possible theft) is higher.

Step 304 follows step 302 in the process of FIG. 3. At step 304, the mailing produced at step 302 is transported from the mailer 102 to a facility of the postal authority 104 and is delivered, in suitably sorted form, to the postal authority 104. As noted above, appropriate sorting is advisable for the probes to serve their intended function. Also, proper sorting may qualify the mailing for reduced postal charges.

Step 306 follows step 302 in the process of FIG. 3. At step 304, the mail pieces of the mailing are directed through the facilities of the postal authority 104, and as part of that step are sorted by sorting equipment 108, which reads the PLANET and POSTNET barcodes from the mail pieces. Mail pieces, including HVMPs and related probes, which have common destinations are sorted into bundles together. Block 308 in FIG. 3 indicates operation of the USPS CONFIRM system to provide observation event data on the basis of the codes read by the sorting equipment 108. The observation event data includes data to identify each mail piece, data to identify the place of sorting/reading and the time/date of the observation event. This data is provided to the mail piece tracking system 110 for storage in the observation event database 210.

Step 310 follows step 306 in the process of FIG. 3. At step 310, bundles of mail pieces as formed at step 306 are forwarded to the next processing facility on the path to the destination of the mail pieces in the bundle. It is next determined, at block 312, whether the bundle has arrived at its final processing step before delivery. If not, the process of FIG. 3 loops back to step 306. However, if it is determined at block 312 that the bundle has reached its final processing step, then step 314 follows. At step 314, the HVMP and its related probe or probe are prepared for final delivery and, if not sharing a specific delivery address, may be separated from each other. The process of FIG. 3 then ends, as indicated at 316.

From the point of view of the postal authority 104, the process of FIG. 3, and particularly steps/blocks 306–314, may be performed in accordance with conventional practices. Thus, the present invention does not require any modification of the postal authority's operation, but rather can be accomplished entirely on the part of the mailer (by preparing mailings in accordance with principles of the present invention as described above) and the mail piece tracking system 110, which may be programmed as described in connection with FIG. 7 below.

Figure 7:
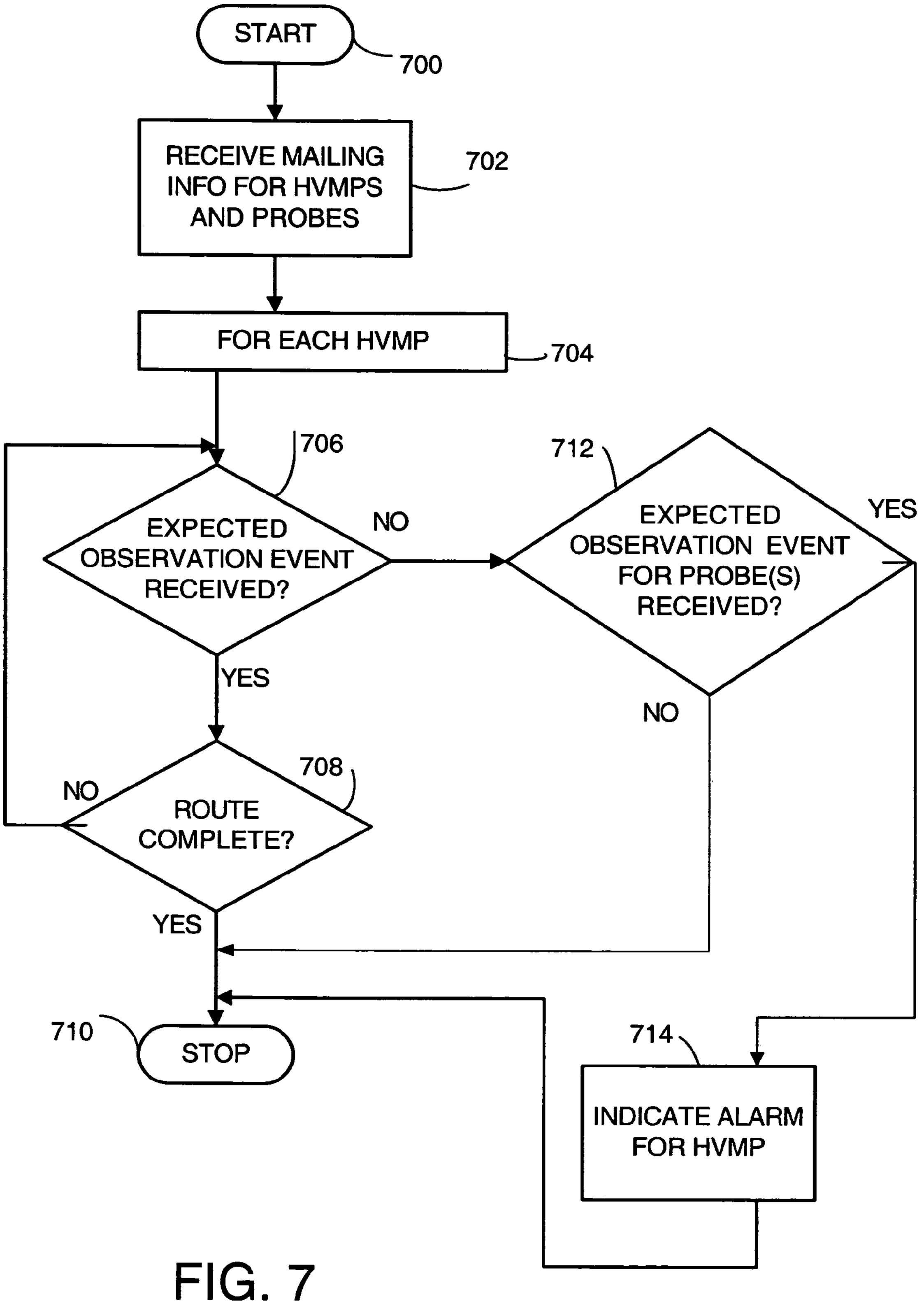
FIG. 7 is a flow chart that illustrates a process that may be provided in accordance with the invention for improved detection of theft of mail pieces

FIG. 7 is a flow chart that illustrates a process that may be performed in accordance with the invention by the mail piece tracking system 110. That is, FIG. 7 may illustrate aspects of the programs 210 referred to in connection with FIG. 2.

The process of FIG. 7 begins at 700 and proceeds to step 702. At step 702, the mail piece tracking system 110 receives from the mailer 102 information concerning mail pieces to be tracked. The mail pieces may have been included in a mailing of the type described in connection with step 302 in FIG. 3. Each mail piece may be identified as either an HVMP or a probe, and may be further identified by an 11 digit DPBC carried by the mail piece and by a mailing identifier such as all or a subset of the PLANET code carried by each mail piece. Furthermore, the mailing information may indicate the date, time and location of delivery of the mailing to the postal authority. As part of or immediately subsequent to step 702, the mail piece data may be stored in the mailing information database 120 (FIGS. 1, 2). In some embodiments, identifying information for related probes may be associated with each HVMP. For example, this may be done on the basis of shared 5 digit zip codes.

Block 704 in FIG. 7 indicates that the procedure to be described below may be performed with respect to each HVMP. Thus for a particular HVMP, among those referred to in the information received at step 702, a determination may be made as to whether an expected observation event has occurred for the HVMP, as indicated by decision block 706. This determination may, for example, be based on the time, date and place of delivery of the HVMP to the postal authority as indicated by the data received at step 702, considered with historical information stored in the historical information database 122. The historical information may provide a basis for predicting by what time in the future a particular observation event can be expected to occur for a mail piece having a certain destination address and delivered to the postal authority at the time, date and place indicated by the data received at step 702. On the basis of such a prediction, the mail piece tracking system 110 may perform a routine to determine whether data indicating occurrence of the expected observation event is received from the postal authority by a predicted time. If the data indicating occurrence of the expected observation event is received, then block 708 may follow block 706. At block 708, it is determined whether the HVMP has reached its final processing point, as indicated by comparing the most recently received observation event data with historical information. If the HVMP has not reached its final processing point, then the process of FIG. 7 loops back to block 706, at which the mail tracking system 110 awaits data indicative of the next expected observation event. It will be appreciated that the next observation event to be expected may be determined based in this case on the historical information stored in the historical information database 122, together with data stored in the observation event database 118 which indicates the most recently observed observation event for the HVMP in question.

Referring again to block 708, if a positive determination is made at that block, i.e., if it is determined at block 708 that the HVMP has reached its final processing point, then the process of FIG. 7 ends (as indicated at 710) with respect to the particular HVMP in question. It should be understood that if all processing by the postal authority occurs normally with respect to a particular HVMP, the process of FIG. 7 may loop through blocks 706 and 708 several times and then may end with an indication of proper processing of the HVMP by the postal authority, without any need to consider observation events for any probe or probes related to the HVMP.

However, if it is determined at block 706 (whether at the first stage or a later iteration of that block with respect to a particular HVMP) that an expected observation event for the HVMP has not occurred, then block 712 follows block 706. At block 712, it is determined whether an expected observation event has occurred with respect to one or more probes related to the HVMP in question for which the expected observation event was determined not to have occurred. The expected observation event for the probe to be considered at 712 may be coincident in time and place with the expected observation event for the HVMP determined at block 706 not to have occurred. (Although the expected observation event considered at block 706 may be coincident in time and place with the expected observation event considered at block 712, the two expected observation events should be thought of as two different expected observation events since they relate to different mail pieces.) The probe or probes for which expected observation events are to be tracked in connection with block 712 may be determined to be related probes to the HVMP in question by reference to the data stored in the mailing information database 120 with respect to the HVMP in question.

If a negative determination is made at block 712, i.e., if it is determined that the expected observation event for the probe or probes did not occur, then it may reasonably be inferred that the non-occurrence of the observation event for the HVMP was a result of manual sorting of the HVMP and its related probe or probes, or the result of other operation by the postal authority, and not the result of theft of the HVMP from the mail stream. Accordingly, the process of FIG. 7 may end with respect to the HVMP in question in the event of a negative determination at step 712.

On the other hand, if a positive determination is made at block 712, i.e., if it is determined that the expected observation event for the probe or probes has occurred, then it may be concluded with a relatively high degree of confidence that the HVMP in question has been removed from the mail stream and may have been stolen. Accordingly, step 714 may follow a positive determination at block 712. At step 714, the mail piece tracking system 110 provides an alarm indication with respect to the HVMP. This alarm indication, it will be recognized, is based at least in part on the non-occurence of the expected observation event considered at block 706 and on the occurrence of the expected observation event considered at block 712. The alarm indication provided at step 714 may take the form of one or more of data sent from the mail piece tracking system 110 to the mailer 102 and data printed out or otherwise directly output by the mail piece tracking system 110. In some embodiments the alarm indication may be visually and/or audibly provided in real time to an operator of the mail piece tracking system 110 or to another human operator or attendant.

Upon receiving or perceiving the alarm indication, the mailer 102 or another party may take suitable countermeasures appropriate to investigate possible theft and/or to prevent losses from the theft. For example, if the HVMP believed to have been stolen contained a credit or debit card, the mailer 102 may put a hold on charges using the credit or debit card.

Although not indicated in FIG. 7, the mail piece tracking system 110 may use event data received in the course of the process of FIG. 7 to update the historical information database 122.

By sending probes in mailings together with HVMPs, in accordance with the present invention, it may be possible to conclude with increased confidence that a HVMP which missed an expected observation event was stolen, when an accompanying probe did not miss a corresponding observation event. Thus, mail piece tracking in accordance with the invention may reduce the likelihood of "false positives" and may provide savings by eliminating unnecessary countermeasures that would otherwise occur in response to false positives. Moreover, thanks to the high degree of automation that may be applied to implementing the present invention, and by using of existing postal authority mail piece tracking services, the present invention may be implemented in a highly cost effective manner. Also, the additional production cost and postal charges incurred with respect to generating and mailing probes may be at least partially offset by advertising revenues or other benefits provided by the probes.

In some embodiments, one HVMP may be used as a probe for another HVMP. That is, for example, if two HVMPs are mailed together to the same 5 digit zip code, and one of the HVMPs misses an observation event while the other HVMP does not miss a corresponding observation event, an alarm indication may be provided with respect to the HVMP which missed the observation event.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. The present invention may be applied, for example, to parcels as well as letter-sized mail pieces, and may also be applied to tracking of items carried by entities other than the USPS. Embodiments of the invention may also employ RFID technology, identification via holography, or any other identification technology in addition to or instead of barcode reading. Barcodes other than the POSTNET and PLANET codes may alternatively be employed. Other variations relating to implementation of the functions described herein can also be implemented. Accordingly, other embodiments are within the scope of the following claims.

What is claimed is:

1. A method comprising:

determining a first likely sequence of expected observation events for a first mail piece and a second likely sequence of expected observation events for a second mail piece wherein the second mail piece is associated with the first mail piece and the second likely sequence of expected observation events is associated with the first likely sequence of expected observation events;

determining that a first expected observation event from the first likely sequence of expected observation events has not occurred for the first mail piece;

using the first expected observation event to determine a second expected observation event associated with the first expected observation event and determining that the second expected observation event has occurred for the second mail piece; and providing an alarm indication with respect to the first mail piece based at least in part on non-occurrence of the first expected observation event and on occurrence of the second expected observation event.

2. The method according to claim 1, further comprising:

after determining the first and second likely sequence of expected observation events and prior to the observation occurrence determining steps, simultaneously delivering the first and second mail pieces to a postal authority.

3. The method according to claim 1, further comprising:

associating a plurality of additional tracked mail pieces with the first mail piece; and providing an alarm indication with respect to the plurality of additional tracked mail pieces based at least in part on non-occurrence of the first expected observation event and on occurrence of the second expected observation event.

4. The method according to claim 1, wherein the first and second expected observation events comprise an induction scan.

5. The method according to claim 1, wherein the first and second expected observation events comprise a postal authority internal sorting equipment sort scan.

6. The method according to claim 1, wherein the first and second expected observation events comprise a delivery sort scan.

7. The method according to claim 1, wherein the first and second likely sequence of expected observation events is determined using historical mail piece processing data.

8. The method according to claim 2, wherein the first mail piece exhibits a first postal code to direct delivery via a first post office and the second mail piece exhibits a second postal code to direct delivery via the first post office.

9. The method according to claim 8, wherein the first and second postal codes are identical to each other.

10. The method according to claim 9, wherein each of the first and second postal codes is indicated as a POSTNET barcode.

11. The method according to claim 10, wherein each of the first and second mail pieces exhibits a respective PLANET barcode.

12. The method according to claim 8, wherein each of the first and second postal codes is indicated as a POSTNET barcode.

13. The method according to claim 12, wherein each of the first and second mail pieces exhibits a PLANET barcode.

14. The method according to claim 2, wherein the first mail piece includes a credit or debit card and the second mail piece does not include a credit or debit card.

15. The method according to claim 14, wherein the second mail piece has an appearance that is substantially different from an appearance of the first mail piece.

16. A mail piece tracking system, comprising:

means for determining a first likely sequence of expected observation events for a first mail piece and a second likely sequence of expected observation events for a second mail piece wherein the second mail piece is associated with the first mail piece and the second likely sequence of expected observation events is associated with the first likely sequence of expected observation events;

first means for determining that a first expected observation event from the first likely sequence of expected observation events has not occurred for the first mail piece second means for using the first expected observation event to determine a second expected observation event associated with the first expected observation event and determining that the second expected observation event has occurred for the second mail piece; and third means, operatively coupled to the first and second means, for providing an alarm indication with respect to the first mail piece based at least in part on non-occurrence of the first expected observation event and on occurrence of the second expected observation event.

17. The mail piece tracking system according to claim 16, further comprising:

an observation event database for storing observation event information;

a mailing information database for storing information indicative of delivery of the first and second mail pieces to a postal authority; and a historical information database for storing information indicative of a sequence of expected observation events for the first and second mail pieces;

the first and second means being operatively coupled to the observation event database, to the mailing information database and to the historical information database.

18. The mail piece tracking system according to claim 16, further comprising:

a processor programmed to constitute at least part of both the first and second means.

19. A mail piece tracking system, comprising:

a processor;

a storage device operatively coupled to the processor and storing a program to control the processor to:

determine a first likely sequence of expected observation events for a first mail piece and a second likely sequence of expected observation events for a second mail piece wherein the second mail piece is associated with the first mail piece and the second likely sequence of expected observation events is associated with the first likely sequence of expected observation events;

determine that a first expected observation event from the first likely sequence of expected observation events has not occurred for the first mail piece;

use the first expected observation event to determine a second expected observation event associated with the first expected observation event and determine that the second expected observation event has occurred for the second mail piece; and provide an alarm indication with respect to the first mail piece based at least in part on non-occurrence of the first expected observation event and on occurrence of the second expected observation event.

20. The mail piece tracking system according to claim 19, wherein the storage device further stores:

an observation event database for storing observation event information;

a mailing information database for storing information indicative of delivery of the first and second mail pieces to a postal authority; and a historical information database for storing information indicative of a sequence of expected observation events for the first and second mail pieces.

* * * * *